3,078,165
PROCESS FOR THE RECOVERY OF PROTEIN SOLIDS FROM ANIMAL FAT

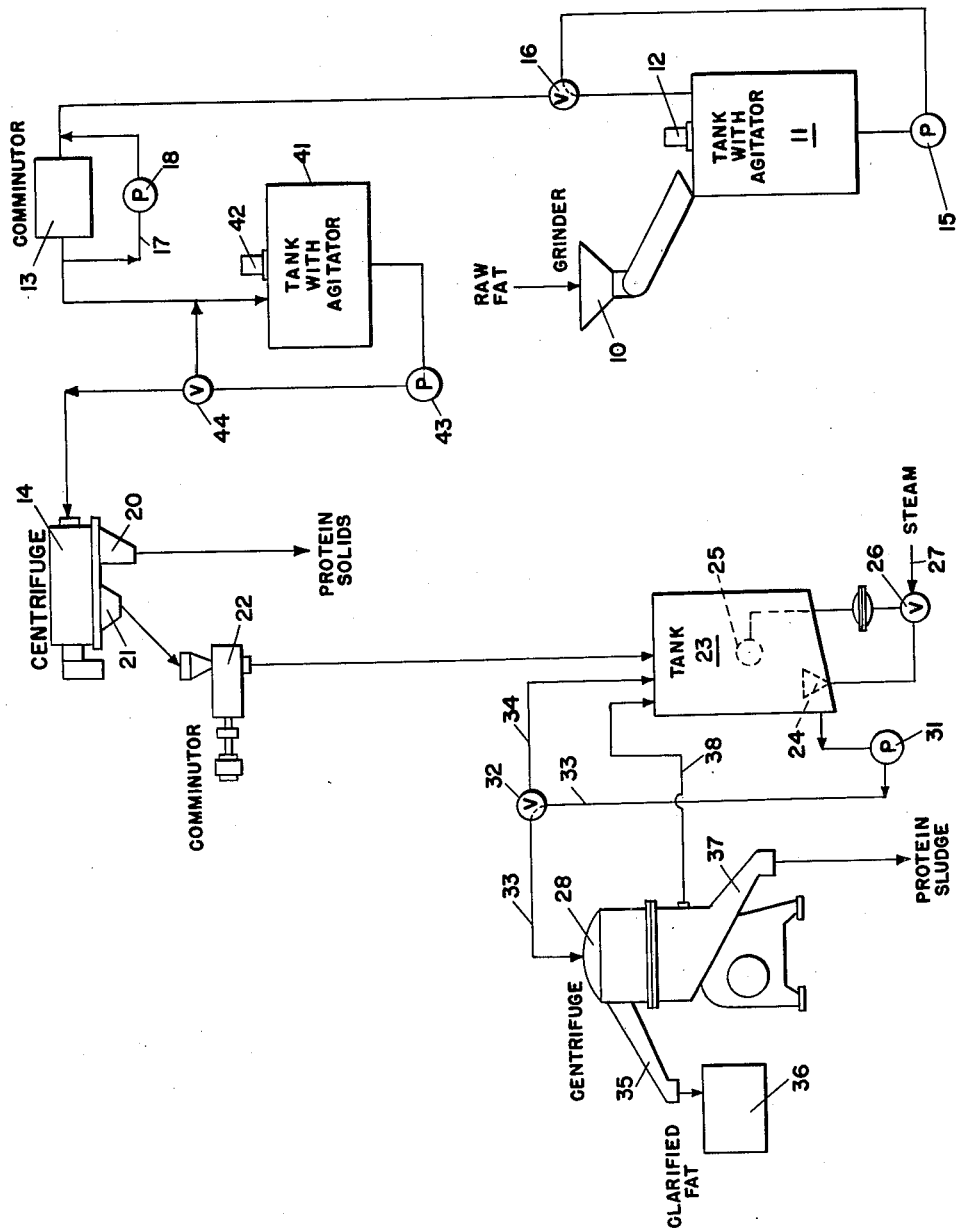

Thomas W. Alberts, Philadelphia, Pa., assignor to The Sharples Corporation, a corporation of Delaware
Filed Oct. 25, 1960, Ser. No. 64,859
10 Claims. (Cl. 99—18)

This invention pertains to the mechanical defatting of fatty tissue derived from animals, such as hogs or cattle, to produce an uncooked meat product, i.e. a meat product in which the protein is not coagulated.

As is well known, the production and marketing of meat products are subject to stringent government regulation and supervision, and products intended for consumption by mankind must meet rather rigid specifications to obtain approval. Such specifications not only involve the source of the meat products, but equally important, sanitation during production, and the nutritional value of the particular meat product produced.

One important outlet for such fatty tissue in partially defatted and in uncooked state is in the production of sausage in which protein solids so derived may be substituted for sausage material derived from other sources, provided that such protein solids have the same or a higher nutritional value than the sausage material in prior use.

The determination of the nutritional value of a food is highly complicated, but in the case of protein solids it is based upon an analysis of the protein for the presence, in required quantity, of the ten essential amino acids which are regarded as necessary for body growth. These are lysine, trypotophen, histidine, phenylalanine, leucine, isoleucine, threonine, methionine, valine and arginine. These essential amino acids are normally present in the protein solids of the fatty tissue which, however, in its normal state, contains far too much fat to be approved as a meat product for human consumption, such as in sausage.

The fat of the fatty tissue is, of course, a valuable product, and great strides have been made in the art in the recovery of the fat, in high quality and high yield, involving the mechanical rupturing of the fatty tissue at relatively low temperatures compared to those employed in the prior conventional wet or dry rendering methods. Although the protein solids thus recovered, particularly when employing the method of U.S. Patent 2,823,215, are of greatly improved value over those obtained when using either the wet or dry rendering method, the invention described and claimed in co-pending application Serial No. 757,598, now Patent No. 3,020,160, issued February 6, 1962, is an outstanding improvement from the standpoint of the production of an uncooked meat product meeting government specifications for sale as such, or in other form, such as in sausage.

Sausage conventionally contains up to 45% moisture and up to 45% fat. Both moisture and fat contribute to texture. It is difficult, if not impossible from a practicable point of view, to add either component in large percentage to protein to synthesize a sausage mix. Moreover, fat sold as an ingredient in sausage commands a price, under present market conditions, which is about twice that of separated fat per se. It follows that the direct production of uncooked sausage material with protein, fat and moisture properly proportioned is highly desirable economically.

In accordance with the invention of co-pending application Serial Number 5393, filed January 29, 1960, by Francis P. Downing, the raw fatty tissue, whether chilled, warm or at room temperature, is ground or otherwise comminuted, e.g. to an average particle size between say 1/32" and 3/4". The ground mass is thereafter warmed by the direct or indirect application of heat to a temperature insufficiently high to melt higher melting fats present, e.g. to a temperature between 90° and 110° F., such as between 95° and 100° F. Thereafter, and by the direct application of mechanical energy to the ground mass, the ground mass is brought up to a temperature sufficiently high to melt the fat present, but not exceeding 120° F., and preferably not exceeding 117° F., whereby thermal equilibrium at a desired temperature for the separation of protein solids from fat is immediately reached throughout the ground mass. Melting of the fat is thus carried out without subjecting the protein solids to cooking or partial cooking conditions, i.e. the protein solids remain in wholly uncoagulated condition. As a result, the protein solids, for practicable purposes, are recovered essentially in their original natural state. Since thermal equilibrium is reached immediately, the mass may be subjected to centrifugal separation at once. By means of said centrifuging, the major part of the protein solids, e.g. between 70 and 95%, or higher, are separated and recovered, such thermal equilibrium, particularly at the low temperatures involved, being essential to the centrifugal separation of protein solids in improved high yield. Raising the temperature of the fatty tissue by the conversion of mechanical energy into heat in manipulation of the fat provides an excellent means for the direct introduction of heat intimately and rapidly throughout the entire mass of fatty tissue under conditions readily affording close control of temperature conditions.

Any suitable device may be employed for the mechanical manipulation of the fatty tissue for purposes of dissipating mechanical energy therein. Examples are machines with high speed rotors capable of imparting energy to the mass through sheer (the mass itself being naturally in a form much like a semi-liquid paste), such as hammer mills, colloid mills, high sheer mixers, comminuting machines, high capacity pumps through which a part of the mass is recirculated, and the like. In the use of such devices, dissipation of mechanical energy is in large part through sheer of the relatively high viscosity fluidized mass of fatty tissue, temperature elevation being due to high friction. Rise in temperature is brought about not only quickly, but also uniformly throughout the mass of fatty tissue, thus establishing thermal equilibrium simultaneously with rise in temperature.

Very close control of temperature is afforded by virtue of the fact that the dissipation of mechanical energy, or in other words, its conversion into heat, is subject to close control through the operation of the device employed for the purpose.

The liquid effluent from the centrifugal separation contains fat, emulsion, water and the rest of the solids, the water being that, or in large part that, originally present in the fat. This liquid effluent may be processed in the same manner as in said patent or as in said first-mentioned co-pending application, e.g. by passing the same through a comminutor to insure reduction of the residual solids to a fine state of sub-division, e.g. to a point where the largest dimension of a particle does not exceed say 0.035", thereafter raising the mass in temperature, either directly, such as with live steam, or indirectly, such as in a heat exchanger, e.g. to between 180° and 210° F., and subsequently subjecting the same to centrifugal separation to recover the fat in purified state.

This invention is an improvement over the invention of said above-mentioned co-pending application Serial Number 5,393. In accordance with the present invention, the comminuted mass during the initial centrifugal separation may have a temperature between 90° F. and 120° F., and more particularly between 95° F. and 117°

F. Also in accordance with the present invention, the separation of protein solids from the fat during the initial centrifugal separation, and the discharge of separated protein solids from the zone of centrifugation, are outstandingly facilitated. These advantages are brought about by subjecting the comminuted mass prior to the initial centrifugal separation to an aging step, whereby difficulty separable protein particles which generally are relatively fine and of a slippery or slimy nature, are firmed up to an extent which markedly aids their separation from the fat, including their discharge from the zone of centrifugation by mechanical means, such discharge by mechanical means, e.g. by a screw, scroll or plow, being conventional to continuous operation.

Additional features and advantages of the invention will become apparent to persons skilled in the art as the specification proceeds and upon reference to the drawings in which:

The single FIGURE is a flow sheet diagrammatically illustrating the new process.

Referring now more particularly to the flow sheet, at 10 is shown a device for grinding or otherwise reducing the fat to small particle size. The fat may be chilled, warm, or at room temperature. Preferably the grinding or other size reduction is such that the average particle size is below ¾", e.g. the range of size reduction obtainable with a meat grinder having interchangeable plate sizes from ¾" to ⅛", i.e. from a plate having ¾" holes, to a plate having ⅛" holes. The ground fat is delivered to tank 11 provided with an agitator indicated at 12. Tank 11 is also provided with means for temperature control of the fat. Any desired means may be employed for the purpose, and indirect temperature control of the fat in tank 11 is preferred, such as by the use of a heating coil or a jacket into which steam or hot water may be introduced to bring the fat to, or to hold the fat at, a desired temperature. The agitator 12 assists in obtaining and maintaining a degree of uniformity of temperature throughout the fat in the tank 11.

The raw fat ground by grinder 10 flows to tank 11, with its protein in uncoagulated condition, and is brought therein to a temperature insufficiently high to melt higher melting fats, e.g. those commonly referred to as stearine, in order to fluidize the mass for continuous flow purposes. This temperature rarely exceeds 110° F., 90° to 100° F. being an excellent range.

The fat under the temperature conditions indicated flows from tank 11 to device 13 for further comminution, and for introducing mechanical energy into the fat to bring about substantially complete thermal equilibrium throughout the feed stream as it passes through. The temperature may be raised in this manner sufficiently high to melt substantially all of the fat, but not exceeding 120° F., and preferably not exceeding 117° F. To produce protein solids having better keeping properties, on the other hand, the temperature preferably should not materially exceed 105° F., operations in the neighborhood of 100° F. frequently being ideal. Since in the practice of the present process it is not essential to melt substantially all of the fat for acceptable or suitable centrifugal separation of fat from protein, but merely to liquefy some of the fat to fluidize it, the temperature may be brought to between 90° F. and 120° F. prior to centrifugal separation anywhere, as desired.

The further comminution in device 13 is such that the average particle size is below ¹⁄₁₆", and preferably below ¹⁄₃₂".

Pump 15 is illustrated for purposes of maintaining a substantially constant flow of fat to device 13 from tank 11, three-way valve 16 being illustrated for returning a part of all of the flow back to tank 11, as and if desired for any reason, e.g. for flow control and/or temperature control purposes. Also line 17 together with pump 18 are illustrated to show that the mass may be recirculated in part or in whole through device 13, as and if desired for any reason, e.g. in part to maintain a chosen temperature level, depending on the construction and operation of device 13.

As pointed out above, device 13 may be of any design and construction capable of comminuting and preferably of converting mechanical input energy in very large part into heat output energy, and of delivering the latter intimately throughout a stream of viscous mass passing therethrough. Many mills are available which calorific measurements show to be of very low efficiency in size reduction as compared to the heat generated during operation, e.g. efficiencies of less than 25% of total input energy.

Comminutors or other mills capable of sheering at a high rate are particularly suitable, such as disk mills generally, and particularly the type that is fed at the center with the space between the disks diminishing as the radial distance increases, the disks rotating relative to each other, and having rough or smooth surfaces.

The comminuted fat flows from device 13 to tank 41 which is provided with an agitator indicated at 42. Tank 41 is also provided with means for temperature control of the fat. Any desired means may be employed for this purpose, and indirect temperature control of the fat in tank 41 is preferred, such as by the use of a heating coil or a jacket into which steam or hot water may be introduced to bring the fat to, or to hold the fat at, a desired temperature within the limits hereinbefore set forth. The agitator 42 assists in obtaining and maintaining uniformity of temperature throughout the fat in the tank 41.

Tank 41 may be in all respects similar to tank 11, and is sufficiently large to provide a substantial average aging period for the fat passing therethrough. This serves for purposes of firming up relatively fine protein particles of a slippery or slimy nature to an extent sufficient to significantly reduce difficulties normally experienced in their separation from the fat. While this aging period may have any desired or suitable length, I find that a minimum average aging time of 10 minutes is highly desirable, and of at least 15 minutes preferred. Longer aging periods are at times beneficial, but additional benefits usually drop off fairly rapidly beyond 30 minutes.

Pump 43 is illustrated for purposes of maintaining a substantially constant flow of fat from tank 41 to centrifuge 14, 3-way valve 44 being illustrated for returning a part or all of the flow back to tank 41, as and if desired for any reason, e.g. for flow control, aging control and/or temperature control purposes.

While the heating facilities provided at tank 41 may be employed for further raising the temperature of the fat, the normal function of these facilities is to maintain uniformity of temperature throughout the fat in tank 41 during the aging period. Thus the heat gradient between the heating medium, e.g. hot water, and the fat is frequently quite low, for example, just sufficient to hold the fat at the temperature at which it is delivered from device 13.

Centrifuge 14 is of the continuous solids-discharge type wherein, in the practice of the invention, the major part of the solids, for example, between 80 and 95%, is removed in relatively dry condition from the rest of the mass and discharged as illustrated at 20. A typical centrifuge suited to the purpose is provided with a scroll for plowing the solids out of contact with the fat and then to a discharge point, an example of which is the centrifuge disclosed in U.S. Patents 2,679,974 and 2,703,676.

The liquid effluent separated in centrifuge 14, which contains the fat, emulsion, water and the rest of the solids is delivered therefrom at 21 and, as shown, flows to comminutor 22 wherein, if required for subsequent processing, the solids present are finely divided to such an extent that the largest dimension of a particle preferably does not exceed say 0.035". Comminutors suitable for the purpose are well known, and need not be further described.

The mass thereafter flows from comminutor 22 to tank 23 wherein its temperature is raised either by direct or indirect heating, such as by live steam, to at least 180° F. and preferably not higher than 210° F. Live steam may be introduced into the mass in tank 23 in any desired manner, steam distributor head 24, thermostat 25, valve 26, and steam source 27 being illustrated for the purpose.

The heated mass flows from tank 23 to centrifuge 28, pump 31 being illustrated for purposes of maintaining the flow substantially constant which is preferred. A three-way valve 32 is illustrated in line 33 leading from pump 31 to centrifuge 28, branch line 34 leading back to tank 23, whereby any desired amount of recirculation through tank 23 may be provided for at will.

High quality fat in high yield is delivered from the centrifuge 28 at 35 and is collected in tank 36 from which it may be delivered to any suitable point not shown. Residual emulsion, the water and the remainder of the solids are delivered from the centrifuge 28 as illustrated at 37.

A suitable centrifuge for performing the operation of centrifuge 28 is illustrated in FIGURES 2 and 3 of the above-mentioned U.S. Patent 2,823,215, such centrifuge operating, for example, in substantially the same manner, for at this point the respective masses to be separated are similar.

This invention represents an improvement over the inventions described and claimed in the above-mentioned patent and in the above-mentioned co-pending applications, in that (1) a relatively low temperature is employed in an initial fat warming step, which (2) is followed by a comminuting step which preferably is accompanied by the introduction into the mass of mechanical energy to obtain thermal equilibrium conditions throughout the mass, the comminuting step being followed, prior to centrifuging, by (3) an aging step of the character and for the purposes above set forth.

The initial heating or warming provides fluidity of the fat at a relatively low temperature. Any subsequent heating to the extent desired and under the conditions specified takes place in device 13 and/or tank 41. After an appropriate aging period carried out as in tank 41, the mass is ready for immediate continuous centrifugal separation of the protein solids from the fluidized mass in high yield and in high quality and in uncoagulated condition.

The following comparative examples are given by way of illustration and not of limitation.

*Example 1*

5000 pounds of pork cutting fat without skins were passed continuously through a grinder having a plate with ¼″ holes. The ground fat then passed through a steam jacketed tank provided with an agitator, and in which the fat was heated to approximately 90° F. A stream of the ground and warm fat was then pumped to a comminutor in which through the application of mechanical energy to the fat the temperature of the fat was raised to approximately 98° F. The fluidized fat stream at 98° F. passed into a second jacketed tank provided with an agitator, and in which the temperature of the mass was brought to and held at 100° F. The latter tank was of a size to provide an average hold-up time of 15 minutes. A stream of the fat at 100° F. was pumped from the latter tank to a continuous solids discharge centrifuge of the type disclosed in U.S. Patents 2,679,964 and 2,703,676 wherein protein solids were continuously separated from fat, water and emulsion. A total of 375 pounds of protein solids having a moisture content of 48% and a fat content of 35% were thus recovered from the mixture.

*Example 2*

This run was essentially the same as that set forth in Example 1, except that the second tank provided in Example 1 for purposes of aging the fluidized fat was omitted. The protein solids separated from the mass in the centrifuge weighed 300 pounds, and had a moisture content of 47% and a fat content of 37%.

Any other animal fat may be substituted in Example 1 with comparable results. This includes beef fat, mutton fat, whale blubber, etc.

It will be understood, of course, that the proportion of protein in fatty tissue varies widely depending upon the animal and the part of the animal from which the fatty tissue is derived, and, such as in the case of cutting fats, the amount of meat that is cut away from the fatty tissue before it is fed to the process. In the practice of the process the available protein, in a form highly suitable for direct use in sausage, may be recovered in high yield, with both moisture and fat excellently proportioned to protein for the purpose.

Skins, particularly in the case of pork, are preferably rejected as raw material, not only in view of government regulations, but also to avoid the possible chance that bristles or hair will find their way into the product. Skins, however, may be processed if desired, or permitted by government regulations.

It is to be understood that the above particular description is by way of illustration and not of limitation, and that changes, omissions, additions, substitutions and/or other modifications may be made without departing from the spirit of the invention. Therefore, it is intended that the patent shall cover, by suitable expression in the claims, the various features of patentable novelty that resides in the invention.

I claim:

1. In a process for the recovery of protein solids from animal fat which comprises subjecting a stream of said fat in small particle size not exceeding $\frac{1}{16}$ inch and under thermal conditions for fluidizing said fat falling between 90° F. and 120° F. to centrifugal separation to continuously remove protein solids from said fat, the step of aging the fluidized fat at a pressure above the pressure at which water boils at said thermal conditions prior to said centrifugal separation to facilitate separation of the more finely divided protein particles from said fat.

2. The process of claim 1 in which temperature conditions do not exceed 105° F.

3. The process of claim 1 in which the elevated temperature conditions are arrived at in stages in a later of which heat is imparted to the fat by the direct application of mechanical energy thereto.

4. The process of claim 3 in which the mechanical energy is imparted to the fat just prior to the aging thereof.

5. The process of claim 1 in which the average time of the aging is at least 10 minutes.

6. The process of claim 1 in which the average time time of the aging is at least 15 minutes.

7. The process of claim 6 in which temperature conditions do not exceed 105° F.

8. A process for the separation of protein solids from raw animal fat which comprises reducing said fat to particle sizes not exceeding approximately ¾ inch, thereafter subjecting said fat to thermal conditions sufficient to fluidize the same, subjecting said fluidized fat to particle size reduction to the extent that particle sizes do not exceed approximately $\frac{1}{16}$ inch, thereafter aging said fat at atmospheric pressure in fluidized condition to firm-up finely divided slimy protein particles present, and subjecting the fat after said aging to centrifuging to remove protein solids therefrom.

9. The process of claim 8 wherein the second-mentioned particle size reduction is accomplished in conjunction with the application of mechanical energy to said fat in a manner to convert mechanical energy into heat to assure thermal equilibrium throughout the fat.

10. The process of claim 9 wherein protein solids upon separation from the fat in the zone of separation are moved mechanically out of contact with the body of fat and then discharged from said zone.

References Cited in the file of this patent
UNITED STATES PATENTS

| | | |
|---|---|---|
| 1,930,091 | Halvorson et al. | Oct. 10, 1933 |
| 2,467,529 | Hormel | Apr. 19, 1949 |
| 2,697,112 | Kramer | Dec. 14, 1954 |
| 2,742,488 | Dufault | Apr. 17, 1956 |
| 2,745,856 | Dayen et al. | May 15, 1956 |
| 2,748,152 | Sifferd et al. | May 29, 1956 |
| 2,911,421 | Greenfield | Nov. 3, 1959 |